Figure 1:
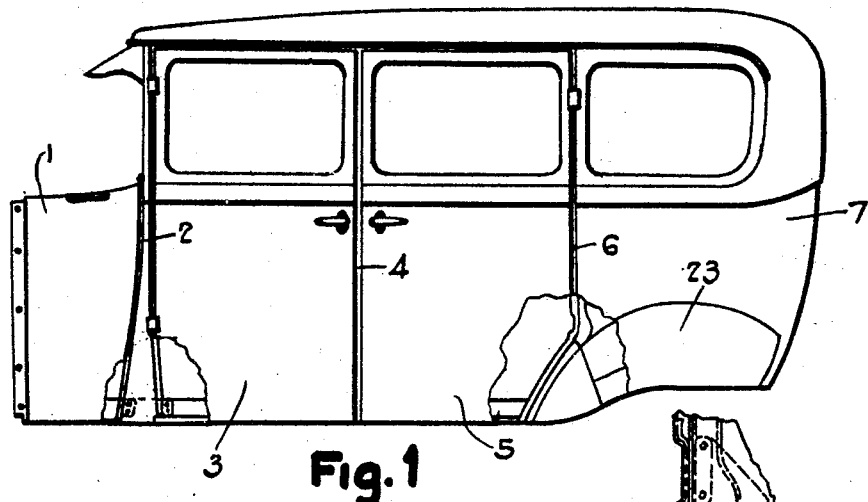

Dec. 1, 1931.  J. LEDWINKA  1,834,524

AUTOMOBILE BODY CONSTRUCTION

Filed April 2, 1927

INVENTOR.
JOSEPH LEDWINKA
BY John P. Barbey
ATTORNEY.

Patented Dec. 1, 1931

1,834,524

UNITED STATES PATENT OFFICE

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA

AUTOMOBILE BODY CONSTRUCTION

Application filed April 2, 1927. Serial No. 180,446.

This invention relates to a pressed metal automobile body construction; more particularly, being directed to the construction of the posts of the body and their connection with the body side sills.

The primary object of this invention is to provide easily effected connections between the body posts and the side sills, which while simple result in unusually strong joints.

Certain other objects and advantages of the invention will be made apparent during the detailed description thereof.

Figure 2:
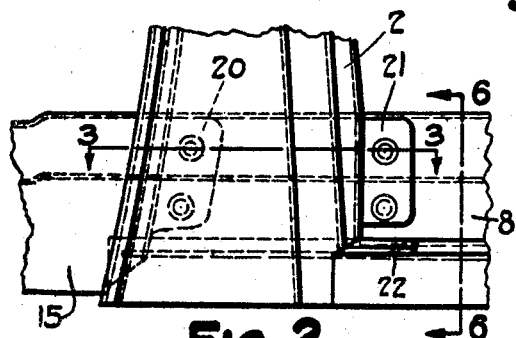
Figure 4:
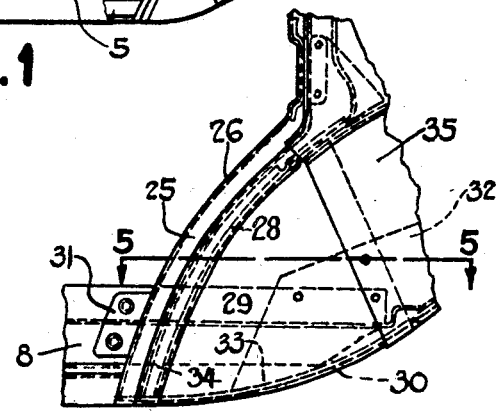
Figure 5:
Figure 5:
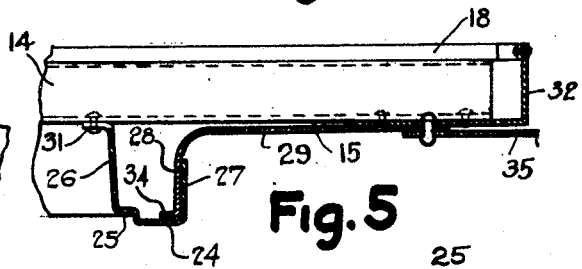
Figure 3:
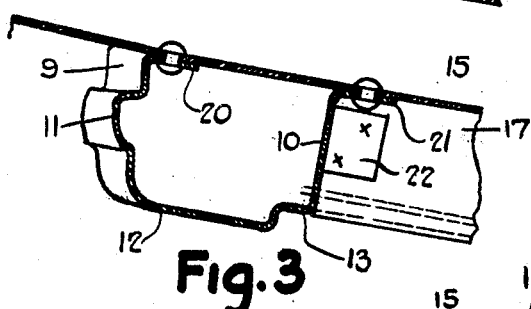
Figure 7:
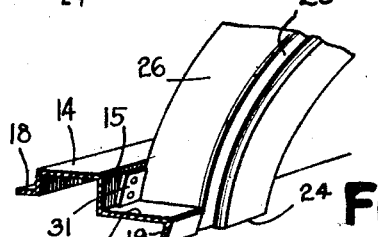
Figure 6:
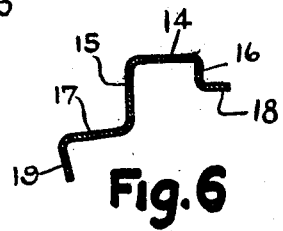

In the embodiment of the invention illustrated in the drawings, the views are as follows:

Fig. 1 shows a pressed metal automobile body in side elevation, the paneling about the connections between the front post and sill, and the post at the rear of the rear door opening and the sill being broken away, Fig. 2 is an enlarged side elevational view of the front posts connection with the sill, Fig. 3 is a horizontal sectional view taken on line 3—3 of Fig. 2, Fig. 4 is an enlarged side elevational view of the connection between the sill and the post at the rear of the door opening, Fig. 5 is a horizontal sectional view taken on line 5—5 of Fig. 4, Fig. 6 is a vertical sectional view taken on the line 6—6 of Fig. 2, and Fig. 7 is a detail perspective view showing the connection of the D-post to the side sill.

The invention, although shown as embodied in an automobile body of the sedan type, is capable of being embodied, in all or in part, in bodies of other types.

In order that this specification will not be unduly prolix the post at the front of the front door opening will be designated as the A post, and the post at the rear of the rear door opening as the D post. The post which is arranged between the two door openings is commonly called the B—C post.

The body illustrated comprises a cowl portion 1, A posts 2, front doors 3, B—C posts 4, rear doors 5, D post 6, and tonneau portion 7. However, as the invention pertains particularly to the posts, sills and the connections therebetween, only these parts of the body will be described in detail, it being understood that the other parts thereof may be of any desirable construction adapted to be used with the specifically described parts.

The A posts 2 are inwardly facing channel members, in general configuration, extending from the body side sills 8 to the roof headers. These posts, below the belt line of the body, have their forward and rearward walls 9 and 10 gradually divergant until they are of greatly increased width adjacent the side sills. There are thus provided posts which present sill connecting surfaces of extended area, while above the belt line these members may be of a minimum section for the purpose of increasing the vision from within the body.

The forward walls 9, at least below the belt line, are provided with forwardly offsets 11 serving to reinforce the posts. The outer walls 12 are inwardly offset at 13 to strengthen the post and to accommodate the overlap flange of the door, thus permitting the use of doors flush with the outer surface of the body.

The body side sills 8 extend from within the cowl to adjacent the post D brackets. These sills are downwardly presenting flanged channels having a top wall 14, and outer and inner walls 15 and 16. The outer wall is considerably longer than the inner wall; these walls having oppositely directed substantially horizontal flanges 17 and 18. The flange 17 is provided with the usual downwardly and inwardly bent flange 19 serving as a finish strip across the door openings.

In order to connect the A posts to the sills, the walls 9 and 10 of the former have tabs 20 and 21, of a height equal to the wall 15 of the sills, cut therefrom and bent so as to extend rearwardly. This permits the posts to be so placed upon the sills that the inner portion of the walls 9 and 10, above the tabs, rest upon the top walls of the sills, while the tabs extend along and are secured to the side walls 15 thereof. The post side walls end at the flange 17, while the outer walls 12 of the posts are carried downwardly alongside of the flange 17 and coextensive therewith. At the bottom of the wall 10 a tab 22 is formed to extend rearwardly upon and be secured to the flange 17. The flanges 17 and 19 of the sills extend to the forward wall of the posts where they terminate and the side wall 15 is extended downwardly, as shown in Fig. 2.

The D posts are inwardly facing channel members the lower ends of which are curved forward from a point approximately upon the same horizontal plane as the wheel housings 23. The outer wall 24 of the D post is offset at 25 to accommodate the door overlap, and the front wall 26 thereof is longer than the rear wall 27.

The D post bracket is substantially triangular in its peripheral contour; the forward edge portion 28 thereof being curved and offset outwardly from the main portion 29. The main portion is bowed so as to form a part of the wheel housing. The bracket upon its lower edge is provided with an inwardly directed flange 30 curved upwardly toward the rear to provide the necessary kick up for the wheel housing.

The body side sill 8 is carried rearwardly to the post D bracket, at which point the wall 16 and flange 18 of the sill continue until adjacent the rear edge of the bracket, the remainder of the sill stopping at the front wall of the post. A tab 31 is turned from the forward wall 26 of the D post and secured to the wall 15 of the sill.

The tonneau side sill 32 is an inwardly facing angle the lower arm 33 of which lies upon the flange 30 of the bracket, conforming the curvature thereof and extending forwardly a short distance beyond the D post. The side sill wall 16, the vertical wall of tonneau sill 32, and the post D bracket are all secured together by riveting or other means.

As previously stated the forward edge portion 28 of the post D bracket is forwardly curved to conform to the forwardly curved part of the D post, and is outwardly offset also. This construction allows the portion 28 of the bracket to be nested within the D post; the bracket bearing against the wall 27 of the post and having a forwardly extending flange 34 lying adjacent to the outer wall 24 of the post. This arrangement provides an unusually strong connection between the bracket and the D post, and also permits the post to be directly connected to the main body side sill.

The quarter paneling 35 of the tonneau overlaps the post D bracket along its rear edge, and is flanged beneath the flange 33 of the tonneau side sill. The paneling is also secured to the D post above the post D bracket.

The connections between the posts and the sills, which have been described, clearly unite these members in a novel manner, and provide an automobile body construction of greatly increased strength.

The invention is susceptible of such modifications and adaptations as fall within the scope of the appended claims.

What I claim is:

1. In an automobile body construction, a channeled post extending from the bottom to the roof of the body, the lower end of the post being forwardly curved, and a bracket having a portion nested within the curved rear portion of the post and secured thereto in said curved portion, said post and said bracket being connected to a common sill member.

2. In an automobile body construction, body side sills and tonneau side sills, inwardly facing channeled posts located at approximately the junction point between the side and tonneau sills having their lower ends forwardly curved and their forward walls connected to the side sills, and bracket members adapted to connect the side and tonneau sills having their forward edges curved and nested within the curved portions of the channeled posts and secured thereto in said curved positions.

3. In an automobile body construction, inwardly facing channeled post stampings located at the rear of the rear door opening and extending from the roof to the floor of the body, the lower ends of said post being forwardly curved and having the rear walls thereof forming a part of the wall of the wheel housing recesses and a member forming an extension of the wheel housing and a brace for the post having its forward edge curved and flanged to lie against the inner side of the rear wall of the post and secured to the post through said flange.

In testimony whereof he hereunto affixes his signature.

JOSEPH LEDWINKA.